Sept. 8, 1942.    L. F. CARTER    2,295,158

GYROSCOPIC ARTIFICIAL HORIZON

Filed Oct. 28, 1939

INVENTOR
Leslie F. Carter,
BY Herbert H. Thompson
his ATTORNEY

Patented Sept. 8, 1942

2,295,158

UNITED STATES PATENT OFFICE 2,295,158

GYROSCOPIC ARTIFICIAL HORIZON

Leslie F. Carter, Leonia, N. J., assignor to Sperry Gyroscope Company, Inc., Brooklyn, N. Y., a corporation of New York Application October 28, 1939, Serial No. 301,773

5 Claims. (Cl. 74—5)

This invention relates to gyroscopic artificial horizons or gyro-verticals which are normally mounted in substantially neutral equilibrium, but which are maintained vertical by indirect action of gravity through a gravitationally controlled source of power which applies an erecting force substantially at right angles to the tilt, and therefore erects the gyroscope in a straight path.

If such erecting force is designed to increase to a substantial amount for a substantial tilt, the gyroscope is adversely affected by acceleration forces due to turns or change of speed. Therefore the present practice is to limit the erecting force so that it does not increase beyond a limited value, regardless of tilt. One such means of effecting this purpose is shown in my prior application for Letters Patent for Pneumatic erection device for gyroscopes, now Patent 2,219,295, dated October 29, 1940. It has been found, however, that with this design, and especially where the gyroscope is not equipped with a caging or centralizing device, the gyroscope does not become usable for some minutes after starting up because a neutral gyroscope is quite apt to be tilted at a large angle to the horizontal at the time of starting up, and the relatively weak erecting force requires some minutes to bring the gyroscope to the vertical.

According to my invention, I provide a simple means for assuring that the gyroscope is near the true vertical position at the time it is started up and also for accelerating the erection during the starting up period so that the gyroscope is in the true vertical by the time, or shortly after, the rotor is brought up to speed. I preferably accomplish this purpose by vertically shifting the center of gravity of the gyroscope with respect to its gimbal pivots so that while the neutral mounting is maintained for normal operation, the center of gravity of the system is lowered when the gyroscope is not running, thereby making the system sufficiently pendulous so that it will stay substantially vertical when not running. In this way it will always be substantially vertical when starting up, so that it need only be erected through a small angle to become vertical.

Referring to the drawing.

Figure 1:
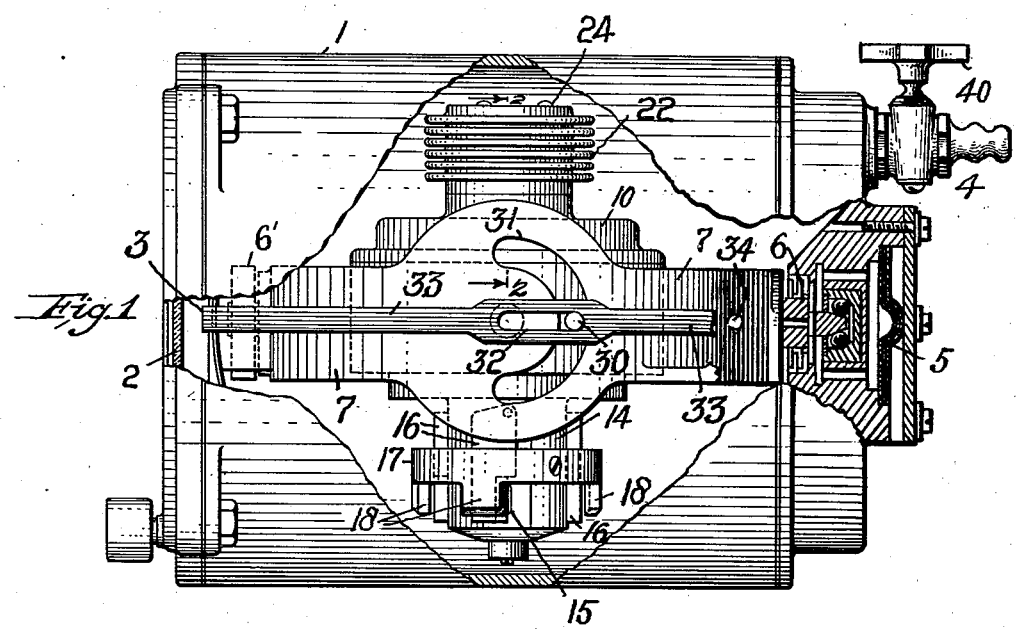
Fig. 1 is a side elevation of the outer casing of a gyroscopic artificial horizon or gyro-vertical with the casing broken away to show the gyroscope within the same.

I have shown my invention as applied to a gyroscopic artificial horizon such as employed on aircraft. Such instrument is usually mounted within a sealed casing 1 having a transparent front window 2 through which a horizon bar 3 actuated from the gyroscope is visible. Such gyroscopes are usually air driven by continuously exhausting the air from the interior of the casing 1, as through the pipe coupling 4 and valve 40 connected to a vacuum pump or Venturi tube (not shown). Air at atmospheric pressure is admitted through a screened opening 5 in the rear of the case, the air passing in through one of the trunnions 6, 6' of the gimbal ring 7, which is made hollow for the purpose. The air then passes through the channel 8 in said gimbal and through one of the minor trunnion axes 9, which is made hollow for the purpose and which supports the rotor bearing casing 10 within the gimbal ring 7. The air then passes through a channel 11 in the casing and emerges through one or more nozzles (not shown) for spinning the rotor 13. The used air passes downwardly through hollow extension 14 on the bottom of the gyro case and out through four erecting ports 15, normally partially closed by pendulous shutters 16, as well understood in the art.

The horizon bar 3 is shown as actuated in the usual manner both for pitch and roll from a pin 30 extending from the rotor casing through an arcuate slot 31 in the gimbal ring 7 and through a normally horizontal slot 32 in the rearwardly extending arm 33 which carries the horizon bar 3 and which is pivoted at 34 on the rear of the gimbal ring.

There is also shown on the extension 14 a baffle ring or spoiler 17 having downwardly extending baffle members or shutters 18 lying just beyond and displaced slightly from the cut-off edges of the pendulous shutters 16. Such spoilers act to limit or reduce the erecting force exerted by the jets from the ports 15 for tilts of more than a few degrees, as more fully explained in my aforesaid patent.

Figures 2, 3:
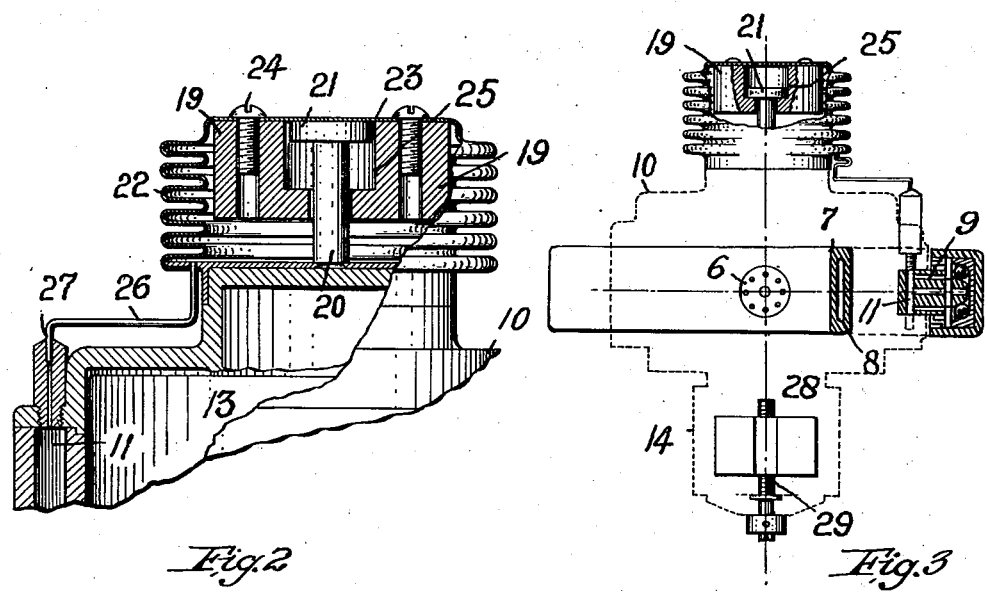
Fig. 2 is a vertical section, on a larger scale, through the upper portion of the rotor bearing casing, taken substantially on line 2—2 of Fig. 1.
Fig. 3 is a side elevation, with parts broken away, of the rotor bearing casing and gimbal ring.

As explained above, such a gyroscope is slow in coming to the vertical position if it happens to be started up in an inclined position, and to overcome this defect I mount on the gyro case 10 a vertically adjustable mass 19 having limited movement. Said mass is shown as slidably mounted on a stem 20 extending from the top of the gyro casing and having a collar 21 thereon to limit the upward movement of the mass. Said mass is also secured at its top to the under side of a flexible bellows or resilient sylphon 22 as by means of set screws 24. The collapsed position of the bellows is shown in Fig. 2, in which the under surface of the top 23 of the bellows rests against the top of the collar 21. The expanded position of said bellows is shown in Fig. 3, in which a guide portion 25 of the mass is brought up against the under surface of the collar 21.

The interior of the bellows is connected through a capillary tube 26 to some point in the system having, during normal operation, a pressure differential as compared to the interior of the case 1 in which the gyroscope and bellows are housed. Preferably, I connect the capillary tube through a small bore coupling 27 to the channel 11 in the rotor casing, said channel being directly connected to the atmosphere through the hollow trunnions and passages in the case and gimbal ring above described. Therefore, when the gyroscope is idle, the bellows will be collapsed and the weight lowered, but when the pump valve 40 is opened, the pressure on the outside of the bellows will rapidly fall. The bellows will therefore expand somewhat until the air pressure within the same is reduced in proportion to the fall in air pressure in casing 1. This, however, starts a slow flow of air through the capillary tube 26 from the superior pressure (approaching that of the atmosphere) within the channel 11. The result is that the mass 19 is slowly and gradually lifted until it reaches its highest position permitted by stop collar 21, shown in Fig. 3. By balancing the gyroscope so that it is in neutral equilibrium with the mass in this lifted position, it will be evident that the gyroscope will be decidedly pendulous with the mass in the lower position. Therefore, when idle, the gyroscope will normally remain approximately vertical so that it will always be ready to start up. Also, by restricting the connection 26, 27 to the interior of the bellows, the lifting of the mass is retarded so that the gyroscope remains somewhat pendulous until the speed of the rotor has reached its normal value. In other words, during the starting up period the pendulosity of the casing will assist in rapid erection in case the gyro happens to be inclined somewhat at the start.

An adjustable balance weight 28 is shown mounted on a threaded stem 29 within the lower extension 14 to accurately adjust the balance of the gyroscope, including the mass 19 in its raised position.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a neutrally mounted gyroscopic horizon, the combination with a gyroscopic element including a rotor casing, rotor and rotor spinning means, all mounted in neutral equilibrium during operation, of a vertically adjustable mass situated on said casing for lowering the center of gravity of the casing to make the same pendulous when the rotor is inoperative, means for shifting said mass to maintain the gyroscopic element in neutral equilibrium during operation, and means for retarding the operation of said shifting means to delay the complete elimination of pendulosity of the gyroscopic element until the rotor is up to speed.

2. In a neutrally mounted gyroscopic horizon, the combination with a gyroscopic element including a rotor casing, rotor, rotor spinning means and an erecting device of limited power, all mounted in neutral equilibrium during operation, of a vertically adjustable mass situated on said casing for lowering the center of gravity of the casing to make the gyroscopic element pendulous when the rotor is inoperative, means for shifting said mass to maintain the gyroscopic element in neutral equilibrium during operation, and means for retarding the operation of said shifting means to delay the complete elimination of pendulosity of the gyroscopic element until the rotor is up to speed to thereby, in connection with the limited effort of the erecting device during initial operation, hasten the positioning of the gyroscopic element to a properly erected condition.

3. In a neutrally mounted gyroscopic horizon having an air operated erecting device of limited power and an air spun rotor, the combination with a neutrally mounted rotor casing, a vertically adjustable mass thereon for lowering the center of gravity to make said casing pendulous when said gyroscope is not running, and a resilient expansible container connected to the supply of operating air pressure to said gyroscope for lifting said mass, whereby the gyroscope is pendulous and will remain upright when not running, but is mounted in neutral equilibrium when running.

4. A gyroscopic horizon as claimed in claim 3, in which the connection of the expansible container to the supply of operating air pressure prevents the lifting movement of said mass from being completed until the gyroscope is up to speed.

5. In a gyro-vertical, the combination with an air spun rotor, a casing for the same mounted for oscillation about horizontal axes, a vertically expansible container on said casing, a mass secured to an end wall of said container to be raised and lowered thereby, a passage for leading air within the casing under a pressure different from that surrounding the casing to spin the rotor, and a capillary connection between the interior of said expansible container and said passage for causing said container to slowly expand as pressure is supplied to spin the rotor, whereby said casing remains pendulous for a predetermined period after the rotor is started.

LESLIE F. CARTER.